United States Patent
Jeong et al.

(10) Patent No.: US 8,019,011 B2
(45) Date of Patent: *Sep. 13, 2011

(54) DIGITAL BROADCAST TRANSMITTING/RECEIVING SYSTEM HAVING AN IMPROVED RECEIVING PERFORMANCE AND SIGNAL PROCESSING METHOD THEREOF

(75) Inventors: Hae-joo Jeong, Seoul (KR); Yong-deok Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

This patent is subject to a terminal disclaimer.

(21) Appl. No.: 11/484,724

(22) Filed: Jul. 12, 2006

(65) Prior Publication Data

US 2007/0002960 A1    Jan. 4, 2007

Related U.S. Application Data (63) Continuation of application No. 11/030,878, filed on Jan. 10, 2005.

(60) Provisional application No. 60/539,111, filed on Jan. 27, 2004.

(30) Foreign Application Priority Data

Oct. 28, 2004    (KR) .................................. 2004-86516

(51) Int. Cl.
*H04L 23/02*    (2006.01)
(52) U.S. Cl. ........................................ 375/265; 375/295
(58) Field of Classification Search .................. 375/222, 375/240.28, 259, 232, 321, 341, 343, 265, 375/295
See application file for complete search history.

(56) References Cited

U.S. PATENT DOCUMENTS

| 1,449,382 A | 3/1923 | Carson |
| 4,058,713 A | 11/1977 | DiToro |
| 4,365,338 A | 12/1982 | McRae et al. |
| 4,447,908 A | 5/1984 | Chevillat et al. |
| 5,023,889 A | 6/1991 | Divsalar et al. |

(Continued)

FOREIGN PATENT DOCUMENTS

CN    1418433 A    5/2003

(Continued)

OTHER PUBLICATIONS

U.S. Appl. No. 11/030,878, filed Jan. 10, 2005, Hae-joo Jeong, Samsung Electronics Co., Ltd.

(Continued)

*Primary Examiner* — Leon Flores
(74) *Attorney, Agent, or Firm* — Sughrue Mion, PLLC (57) ABSTRACT

A digital broadcast transmitting/receiving system and a signal processing method thereof that can improve the receiving performance of the system. A digital broadcast transmitter has a randomizer to randomize an input data stream which has null bytes being inserted at a specified position, a multiplexer to output a data stream formed by inserting specified known data into the position of the null bytes of the randomized data stream, an encoder to encode the data stream outputted from the multiplexer, and a modulator/RF-converter to modulate the encoded data, RF-convert the modulated data and transmit the RF-converted data. The receiving performance of the digital broadcast transmitting/receiving system can be improved even in a multi-path channel by detecting the known data from the received signal and using the known data in synchronization and equalization in a digital broadcast receiver.

6 Claims, 10 Drawing Sheets

U.S. PATENT DOCUMENTS

| | | | |
|---|---|---|---|
| 5,105,443 | A | 4/1992 | Betts et al. |
| 5,111,155 | A | 5/1992 | Keate et al. |
| 5,127,051 | A | 6/1992 | Chan et al. |
| 5,260,972 | A | 11/1993 | Wang |
| 5,263,051 | A | 11/1993 | Eyuboglu |
| 5,267,269 | A | 11/1993 | Shih et al. |
| 5,394,440 | A | 2/1995 | Goldstein et al. |
| 5,541,964 | A | 7/1996 | Cohen et al. |
| 5,602,602 | A | 2/1997 | Hulyalkar |
| 5,604,724 | A | 2/1997 | Shiokawa |
| 5,625,642 | A | 4/1997 | Wornell |
| 5,841,484 | A | 11/1998 | Hulyalkar et al. |
| 6,044,111 | A | 3/2000 | Meyer et al. |
| 6,256,494 | B1 | 7/2001 | Lopes et al. |
| 6,374,386 | B1 | 4/2002 | Kim et al. |
| 6,397,367 | B1 | 5/2002 | Park et al. |
| 6,445,750 | B1 | 9/2002 | Chen et al. |
| 6,477,208 | B1 | 11/2002 | Huff |
| 6,687,310 | B1 | 2/2004 | Fimoff et al. |
| 6,760,077 | B2 * | 7/2004 | Choi et al. ............. 348/614 |
| 6,760,374 | B1 | 7/2004 | Tapp et al. |
| 6,763,064 | B1 | 7/2004 | Graf et al. |
| 6,810,084 | B1 * | 10/2004 | Jun et al. ............. 375/240.28 |
| 6,912,258 | B2 | 6/2005 | Birru |
| 6,922,215 | B2 * | 7/2005 | Choi et al. ............. 348/726 |
| 6,973,137 | B2 | 12/2005 | Birru et al. |
| 6,985,093 | B2 | 1/2006 | Jaffe et al. |
| 7,031,382 | B2 | 4/2006 | Hessel et al. |
| 7,111,221 | B2 * | 9/2006 | Birru et al. ............. 714/755 |
| 7,327,403 | B2 | 2/2008 | Choi et al. |
| 7,593,474 | B2 * | 9/2009 | Jeong et al. ............. 375/265 |
| 2001/0005234 | A1 * | 6/2001 | Choi et al. ............. 348/470 |
| 2001/0034867 | A1 | 10/2001 | Jaffe et al. |
| 2002/0181581 | A1 | 12/2002 | Birru et al. |
| 2002/0181599 | A1 | 12/2002 | Choi et al. |
| 2003/0021341 | A1 | 1/2003 | Vigil et al. |
| 2003/0048839 | A1 | 3/2003 | Beale et al. |
| 2003/0099303 | A1 | 5/2003 | Birru et al. |
| 2003/0099309 | A1 | 5/2003 | Fimoff et al. |
| 2003/0103575 | A1 | 6/2003 | Birru et al. |
| 2003/0226088 | A1 | 12/2003 | Cameron et al. |
| 2005/0163196 | A1 | 7/2005 | Currivan et al. |
| 2006/0269012 | A1 * | 11/2006 | Kim et al. ............. 375/270 |

FOREIGN PATENT DOCUMENTS

| | | |
|---|---|---|
| EP | 0 533 363 | 3/1993 |
| EP | 0 913 950 | 5/1999 |
| JP | 11-239179 | 8/1999 |
| KR | 2001-111667 | 12/2001 |
| KR | 2002-5455 | 7/2002 |
| KR | 2002-62076 | 7/2002 |
| KR | 2002-89078 | 11/2002 |
| KR | 2003-41109 | 5/2003 |
| KR | 2006-18848 | 3/2006 |
| WO | WO 99/32779 | 5/1999 |
| WO | WO 01/63868 | 8/2001 |
| WO | WO 02/058387 | 7/2002 |
| WO | WO 02/093754 | 11/2002 |
| WO | WO 03/017499 | 2/2003 |

OTHER PUBLICATIONS

Office Action issued in Korean Patent Application No. 2004-101931 on May 19, 2006.

Search Report and Written Opinion issued on Aug. 24, 2005 for International Patent Application No. PCT/KR/001313.

Vandenameele, Patrick, et al., "Blind vs. Trained Channel Estimation for an SDMA WLAN", *IEEE*, 1998, pp. 465-470.

Pietrobon, Steven S., et al., "Rotationally Invariant Nonlinear Trellis Codes for Two-Dimensional Modulation", *IEEE Transactions on Information Theory*, V. 40, No. 6, Nov. 1994, pp. 1773-1791.

Tsatsanis, Michail K., et al. "Estimation and Equalization of Fading Channels with Random Coefficients", *Signal Processing*, vol. 53, 1996, pp. 211-229.

Moon, Sung-Hoon, et al., "Spatial Diversity Technique for Improvement of DTV Reception Performance", *IEEE Transactions on Consumer Electronics*, V. 49, No. 4, Nov. 2003, pp. 958-964.

Speth, Michael, et al., "MLSE Based Detection for GFSK Signals with Aribitrary Modulation Index", *International Zurich Seminar on Communications*, Feb. 2004, pp. 228-231.

Pupolin, Silvano, et al. "Progetto Primo Report", *Instituto Superiore Mario Boella*, Jan. 2002.

Heo, Seo Weon, et al. "A Concatenated Equalizer/Trellis Decoder Architecture for a Terrestrial Digital Television Receiver", *IEEE*, 2004, pp. 813-819.

Santella, Giovanni, "OFDM with Guard Interval and Sub-Channel Equalizationing a 2-Resoluation Transmission Scheme for Digital Television Broadcasting", *IEEE*, 1994, 374-380.

Son, Sang-Won, et al. "Frequency-Domain Equalization for Distributed Terrestrial DTV Transmission Environments", *IEEE*, 2006, pp. 59-67.

Rohling, H., et al. "Differential Amplitude Phase Shift Keying (DAPSK)—A New Modulation Method for DTVB", *International Broadcasting Convention—Conference Publication*, No. 413, 1995, pp. 102-108.

Pietrobon, Steven S., "Trellis-Coded Multidimensional Phase Modulation", *IEEE Transactions on Information Theory*, V. 36, No. 1, Jan. 1990, pp. 63-89.

Park, Jeongsoon, et al., "Error Propagation in Decision Feedback Equalization for a Terrestrial Digital Television Receiver", *IEEE*, 2003, pp. 927-932.

Ölcer, Sedat, et al. "Difference-Metric Viterbi Decoding of Multilevel Class-IV Partial Response Signals", *IEEE Transactions on Communication*, V. 42, No. 2/3/4, Feb.-Apr. 1994, pp. 1558-1570.

Martone, Massimiliano, "Optimally Regularized Channel Tracking Techniques for Sequence Estimation Based on Cross-Validated Subspace Signal Processing", *IEEE Transactions on Communications*, V. 48, No. 1, Jan. 2000, pp. 95-105.

Baek, Jong-Seob, et al., "Hybrid Fast Kalman and Variable Step-Size LMS Decision Feedback Equilizer for 8-VSB DTV", *IEEE*, 2003, pp. 2362-2366.

Oh, Jisung, et al., "A Single VSB/QAM/QPSK IC for ATSC and Opencable™ Digital Terminals", *IEEE*, 2001, pp. 443-449.

Kim, Hyoung-Nam, et al., "Performance Analysis of Error Propagation Effects in the DFE for ATSC DTV Receivers", *IEEE Transactions on Broadcasting*, V. 49, No. 3, Sep. 2003, pp. 249-257.

Hongwei, Liu, et al., "Blind Equalization Algorithm Based on Cyclostationary Property of IF Signal", *Proceedings of ICSP*, 1998, pp. 498-501.

Liu, Hong, "Frequency-Domain Equalization of Single Carrier Transmissions Over Doubly Selective Channels", Dissertation, Graduate School of The Ohio State University, 2007.

Ungerboeck, Gottfried, "Trellis-Coded Modulation with Redundant Signal Sets—Part I: Introduction", *IEEE Communications Magazine*, V. 25, No. 2, Feb. 1987, p. 5-11.

Ungerboeck, Gottfried, "Channel Coding with Multilevel/Phase Signals", *IEEE Transactions on Information Theory*, V. IT-28, No. 1, Jan. 1982, pp. 55-67.

Godard, Dominique N., "Self-Recovering Equalization and Carrier Tracking in Two-Dimensional Data Communication Systems", *IEEE Transactions on Communications*, V. Com-28, No. 11, Nov. 1980, pp. 1867-1875.

Ghosh, Monisha, "Blind Decision Feedback Equalization for Terrestrial Television Receivers", *Proceedings of the IEEE*, V. 86, No. 10, Oct. 1998, pp. 2070-2081.

Lee, Gen-kwo, et al., "Bayesian Decision Feedback Techniques for Deconvolution", *IEEE Journal on Selected Areas in Communications:*, V. 13, No. 1, Jan. 1995, pp. 155-166.

Gaddam, Vasanth R., et al., "A Newly Proposed ATSC DTV System for Transmitting a Robust Bit-stream along with the Standard Bitstream", *IEEE*, 2003, pp. 933-938.

Farasakh, Christof, et al., "Data Detection and Channel Allocation on the Uplink of an SDMA Mobile Radio System", *IEEE*, 1997, pp. 2168-2172.

Cherubini, G, et al., "Adaptive Analog Equalization and Receiver Front-End Control for Multilevel Partial-Response Transmission Over Metallic Cables", *IEEE Transactions on Communications*, V. 44, No. 6, Jun. 1996, pp. 675-685.

Lim, Chae-Hyun, et al. "Channel Selective Diversity for DTV Mobile Reception with Adaptive Beamforming", *IEEE*, 2005, pp. 357-364.

Bugallo, Mónica F., et al., "Decision-Feedback Semiblind Channel Equalization in Space-Time Coded Systems", *IEEE*, 2002, pp. 2425-2428.

Bucher, Mary Louise, "Simulation of Multipath Fading/Ghosting for Analog and Digital Television Transmission in Broadcast Channels", *IEEE Transactions on Broadcasting*, V. 38, No. 4, Dec. 1992, pp. 256-262.

Office Action issued by Korean Intellectual Property Office in Korean Patent Application No. 2004-86516 on Sep. 11, 2006.

Trial Decision of Korean Intellectual Property Tribunal, Trial No. 2006won9036, for Korean Patent Application No. 2004-86516, Aug. 30, 2007.

Office Action issued by Russian Patent Office in Russian Patent Application No. 2006124608 on Oct. 19, 2007.

U.S. Appl. No. 12/175,884, filed Jul. 18, 2008, Hae-Joo Jeong et al., Samsung Electronics Co., Ltd.

U.S. Appl. No. 11/121,064, filed May 5, 2005, Hae-Joo Jeong et al., Samsung Electronics Co., Ltd.

Office Action issued by Canadian Intellectual Property Office in Canadian Patent Application No. 2,554,495 on Aug. 31, 2009.

ATSC Standard : Digital Television Standard (A/53) (www.atsc.org), Jul. 2004.

International Search Report mailed on May 21, 2005, in International Application No. PCT/KR2005/000179.

Written Opinion of the International Searching Authority mailed on May 21, 2005, in International Application No. PCT/KR2005/000179.

Korean Office Action issued on Apr. 20, 2006, in Korean Application No. 2004-86516 (in Korean).

Communication from the State Intellectual Property Office of P.R. China dated Mar. 23, 2011, in Application No. 200910118486.8.

\* cited by examiner

DIGITAL BROADCAST TRANSMITTING/RECEIVING SYSTEM HAVING AN IMPROVED RECEIVING PERFORMANCE AND SIGNAL PROCESSING METHOD THEREOF

CROSS-REFERENCE TO RELATED APPLICATIONS

This application is a continuation application of Ser. No. 11/030,878, filed on Jan. 10, 2005 in the United States Patent and Trademark Office, currently pending, the disclosure of which is incorporated herein by reference. This application claims the benefit under 35 U.S.C. §119 of U.S. Provisional Application No. 60/539,111 filed on Jan. 27, 2004, and Korean Patent Application No. 2004-86516, the disclosures of which are incorporated herein.

BACKGROUND OF THE INVENTION

1. Field of the Invention

The present general inventive concept relates to a digital broadcast transmitting/receiving system and a signal processing method thereof, and more particularly, to a digital broadcast transmitting/receiving system and a signal processing method thereof which can improve the receiving performance of the system by inserting a known sequence into a VSB (Vestigial Side Band) data stream and transmitting the data stream with the inserted known sequence.

2. Description of the Related Art

An ATSC (Advanced Television Systems Committee) VSB system that is an American-type digital terrestrial broadcasting system in a signal carrier type broadcasting system, and uses a field sync signal in the unit of 312 segments.

Figure 1:
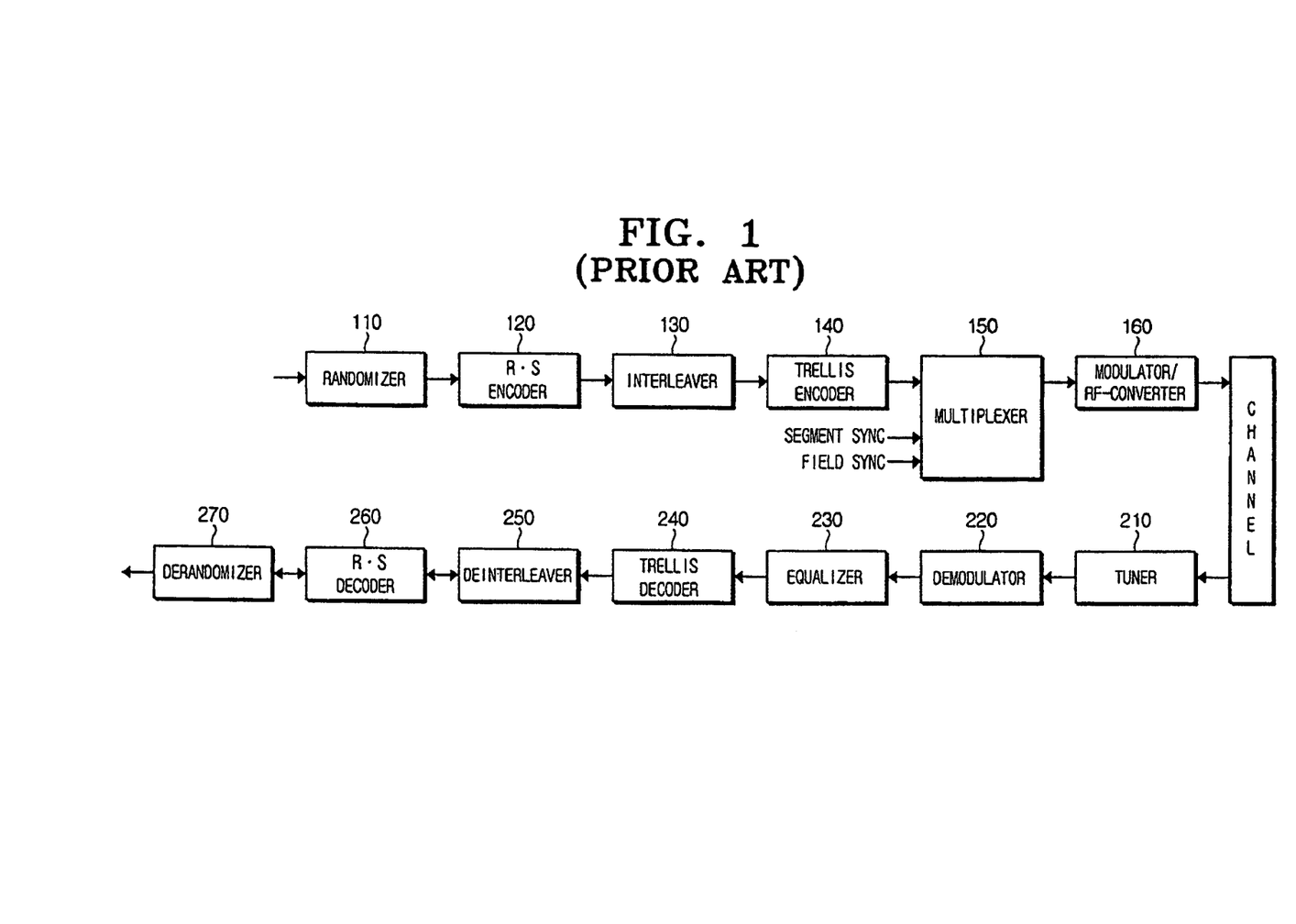
FIG. 1 is a block diagram illustrating the construction of a transmitting/receiving system of a general American-type digital broadcasting (ATSC VSB) system.

FIG. 1 is a block diagram illustrating the construction of a transmitter/receiver of an ATSC DTV standard as a general American-type digital terrestrial broadcasting system.

The digital broadcast transmitter of FIG. 1 includes a randomizer 110 for randomizing an MPEG-2 (Moving Picture Experts Group) transport stream (TS), an RS (Reed-Solomon) encoder 120 for adding RS parity bytes to the transport stream in order to correct bit errors occurring due to the channel characteristic in a transport process, an interleaver 130 for interleaving the RS-encoded data according to a specified pattern, and a trellis encoder 140 for mapping the interleaved data onto 8-level symbols by performing a trellis encoding of the interleaved data at the rate of ⅔. The digital broadcast transmitter performs an error correction coding of the MPEG-2 transport stream.

The digital broadcast transmitter further includes a multiplexer 150 for inserting a segment sync signal and a field sync signal into the error-correction-coded data, and a modulator/RF-converter 160 for inserting a pilot tone into the data symbols into which the segment sync signal and the field sync signal are inserted by inserting a specified DC value into the data symbols, performing a VSB modulation of the data symbols by pulse-shaping the data symbols, and up-converting the modulated data symbols into an RF channel band signal to transmit the RF channel band signal.

Accordingly, the digital broadcast transmitter randomizes the MPEG-2 transport stream, outer-codes the randomized data through the RS encoder 120 that is an outer coder, and distributes the coded data through the interleaver 130. Also, the digital broadcast transmitter inner-codes the interleaved data in the unit of 12 symbols through the trellis encoder 140, performs the mapping of the inner-coded data onto the 8-level symbols, inserts the field sync signal and the segment sync signal into the coded data, performs the VSB modulation of the data, and then up-converts the modulated data into the RF signal to output the RF signal.

Meanwhile, the digital broadcast receiver of FIG. 1 includes a tuner 210 for down-converting an RF signal received through a channel into a baseband signal, a demodulator 220 for performing a sync detection and demodulation of the converted baseband signal, an equalizer 230 for compensating for a channel distortion of the demodulated signal occurring due to a multi-path, a trellis decoder 240 for correcting errors of the equalized signal and decoding the equalized signal to symbol data, a deinterleaver 250 for rearranging the data distributed by the interleaver 130 of the digital broadcast transmitter, an RS decoder 260 for correcting errors, and derandomizer 270 for derandomizing the data corrected through the RS decoder 260 and outputting an MPEG-2 transport stream.

Accordingly, the digital broadcast receiver of FIG. 1 down-converts the RF signal into the baseband signal, demodulates and equalizes the converted signal, and then channel-decodes the demodulated signal to restore to the original signal.

Figure 2:
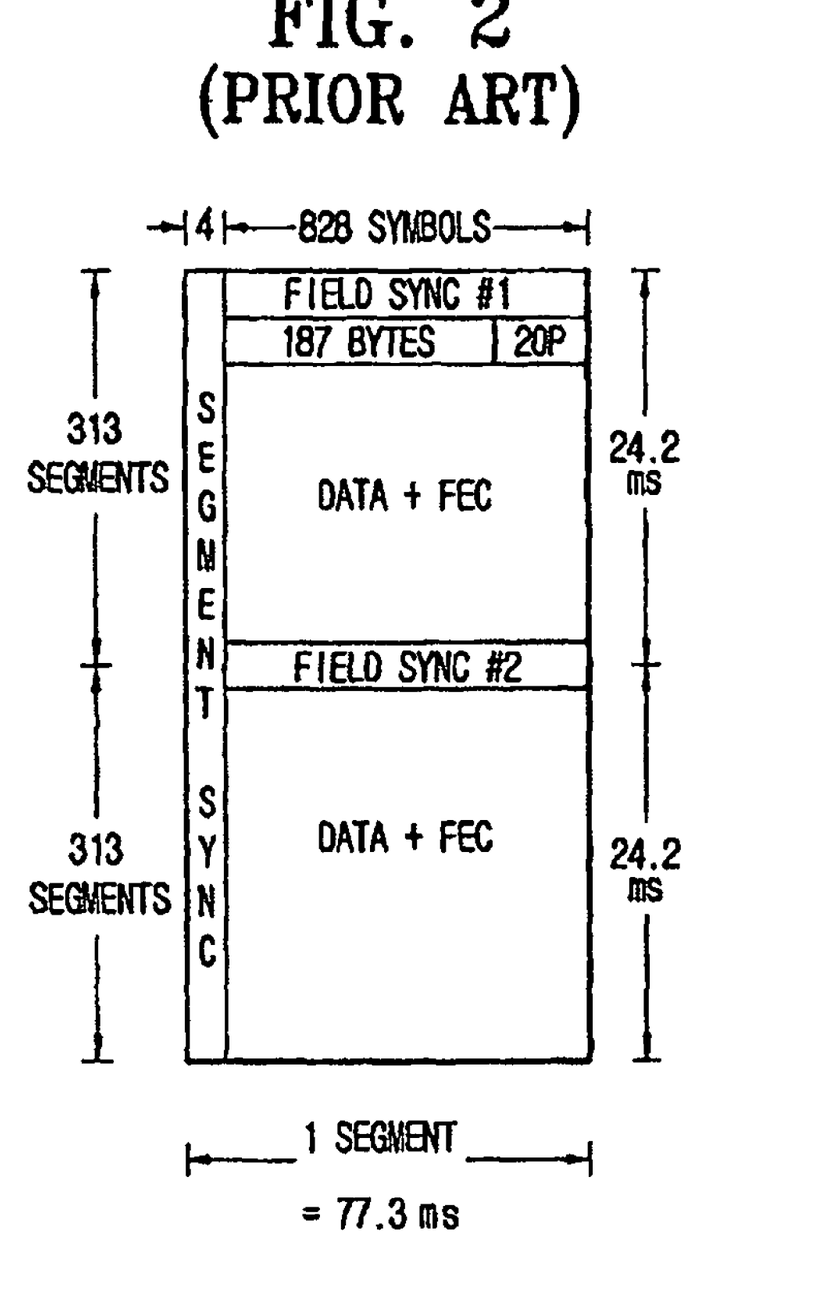
FIG. 2 is a view illustrating the structure of an ATSC VSB data frame.

FIG. 2 illustrates a VSB data frame for use in the American type digital broadcasting (8-VSB) system, into which a segment sync signal and a field sync signal are inserted.

As shown in FIG. 2, one frame is composed of two fields, and one field is composed of one field sync segment that is the first segment and 312 data segments. Also, one segment in the VSB data frame corresponds to one MPEG-2 packet, and is composed of a segment sync signal of four symbols and 828 data symbols.

In FIG. 2, the segment sync signal and the field sync signal are used for the synchronization and equalization in the digital broadcast receiver. That is, the field sync signal and the segment sync signal refer to known data between the digital broadcast transmitter and receiver, which is used as a reference signal when the equalization is performed in the receiver side.

As shown in FIG. 1, the VSB system of the American type digital terrestrial broadcasting system is a single carrier system, and thus has a drawback in that it is weak in a multi-path fading channel environment having the Doppler effect. Accordingly, the performance of the receiver is greatly influenced by the performance of the equalizer for removing the multi-path.

However, according to the existing transport frame as shown in FIG. 2, since the field sync signal that is the reference signal of the equalizer appears once for every 313 segments, its frequency is quite low with respect to one frame signal, and this causes the performance of equalization to deteriorate.

Specifically, it is not easy for the existing equalizer to estimate the channel using a small amount of data as above and to equalize the received signal by removing the multi-path. Accordingly, the conventional digital broadcast receiver has the disadvantages that its receiving performance deteriorates in an inferior channel environment, and especially in a Doppler facing channel environment.

SUMMARY OF THE INVENTION

The present general inventive concept has been developed in order to solve the above drawbacks and other problems associated with the conventional arrangement.

Accordingly, the present general inventive concept provides a digital broadcast transmitting/receiving system and a signal processing method thereof that can improve the receiving performance of the system by generating and transmitting a transport signal with known data added thereto in a transmitter side and by detecting the transport signal in a receiver side.

Additional aspects and advantages of the present general inventive concept will be set forth in part in the description which follows and, in part, will be obvious from the description, or may be learned by practice of the general inventive concept.

The foregoing and other aspects and advantages of the present general inventive concept are substantially realized by providing a digital broadcast a digital broadcast transmitter, comprising a randomizer to randomize an input data stream which has null bytes being inserted at a specified position, a multiplexer to output a data stream formed by inserting specified known data into the position of the bull bytes of the randomized data stream, an encoder to encode the data stream outputted from the multiplexer, and a modulator/RF-converter to modulate the encoded data stream, RF-convert the modulated data stream and to transmit the RF-converted data stream, and a digital broadcast receiver, comprising a tuner to receive a signal from the digital broadcast transmitter and convert the received signal into a baseband signal, the signal having been encoded by inserting the known data, a demodulator to demodulate the baseband signal, a known data detector to detect the known data from the demodulated signal, and an equalizer to equalize the demodulated signal using the known data outputted from the known data detector.

In addition, a data generator is provided to generate the known data by generating a sequence having a predefined pattern. The data stream includes information about the specified position into which the null bytes are inserted.

The information is inserted into a position preceding the inserted null bytes, and contains information about the length of the null bytes.

The encoder has a Reed-Solomon (RS) encoder to add a parity of specified bytes to the data in order to correct errors occurring due to channels, an interleaver to interleave the parity-added data in a specified pattern, and a trellis encoder to convert the interleaved data into 8 level symbols by performing a trellis encoding of the interleaved data at the rate of ⅔.

The interleaver outputs a successive data stream of the known data which are inserted into the same position of a plurality of different data streams outputted from the multiplexer.

The modulator/RF-converter modulates the data by a vestigial side band (VSB) modulation method.

The digital broadcast transmitter further includes a second multiplexer to insert a segment sync signal into the data converted into symbols by the trellis encoder in the unit of a segment, to insert a field sync signal into the data in the unit of a field, and to insert a pilot signal into an edge portion of a low frequency band of a frequency spectrum by adding a specified DC value to the data signal of a specified level.

The known data detector includes at least one correlator to calculate a correlation value of the received signal and at least one reference signal, and a comparator to detect the known data by comparing the correlation values outputted from the correlator.

The reference signal is output value produced by encoding the signal that includes the known data.

The known data detector outputs the detected known data to the demodulator, and the demodulator performs the demodulation using the known data.

The foregoing and/or other aspects and advantages of the present general inventive concept may also be achieved by providing a signal processing method for a digital broadcast system including randomizing an input data stream which has null bytes being inserted at a specified position, outputting a data stream which is formed by inserting specified known data into the position of the null bytes of the randomized data stream, encoding the data stream for error correction, modulating the encoded data stream, RF-converting the modulated data stream and transmitting the RF-converted data stream, receiving a signal from a digital broadcast transmitter and converting convert the received signal into a baseband signal, the signal having been is that is encoded by inserting known data, demodulating the baseband signal, detecting the known data from the demodulated signal, and equalizing the demodulated signal using the known data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 3:
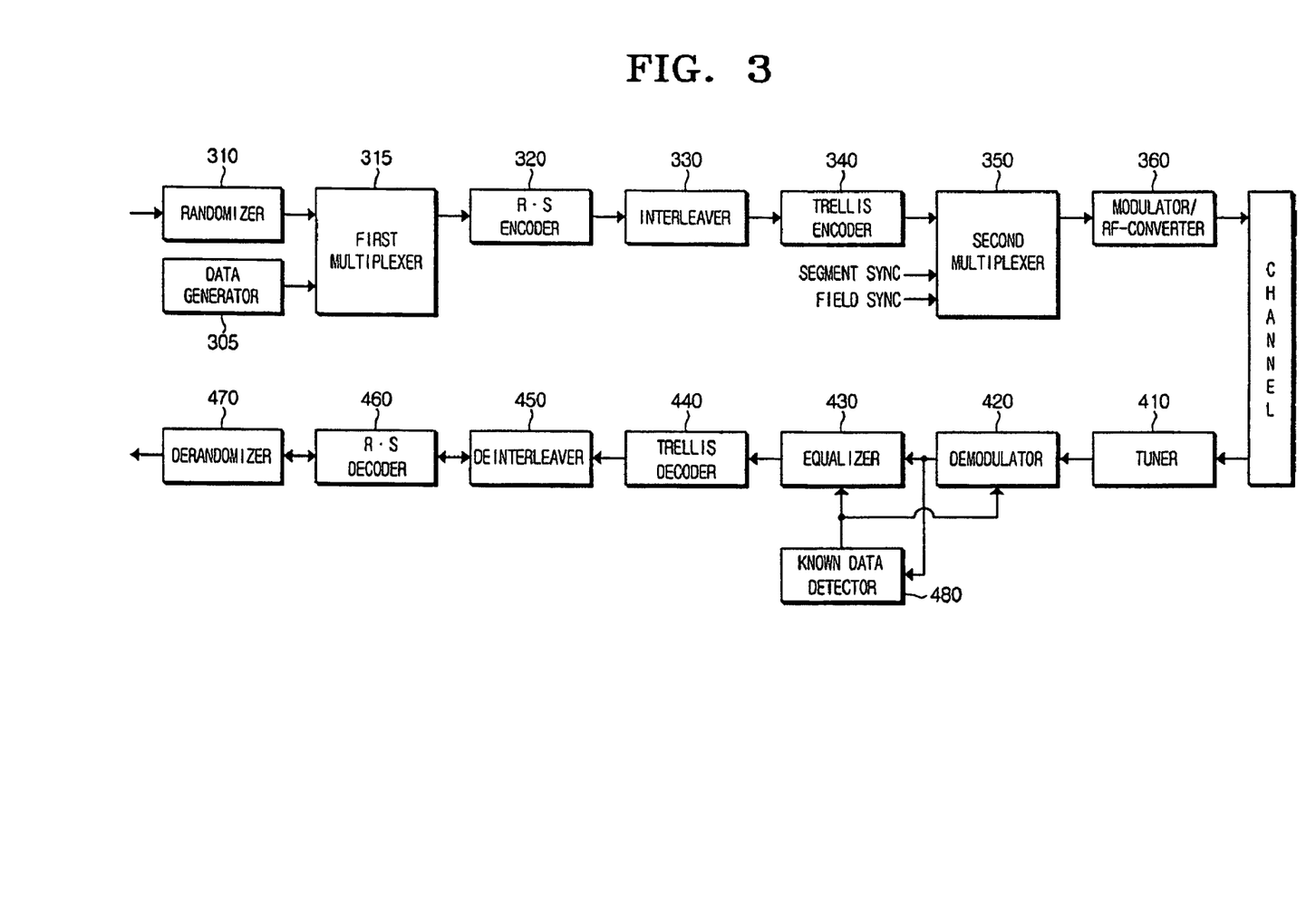
FIG. 3 is a block diagram illustrating the construction of a digital broadcast transmitting/receiving system according to an embodiment of the present general inventive concept.

FIG. 3 is a block diagram illustrating the construction of a digital broadcast transmitting/receiving system according to an embodiment of the present general inventive concept.

Referring to FIG. 3, the digital broadcast transmitter includes a data generator 305, a randomizer 310, a first multiplexer 315, an RS encoder 320, an interleaver 330, a trellis encoder 340, a second multiplexer 350 and a modulator/RF-converter 360.

The randomizer 310 randomizes an input MPEG-2 transport stream data in order to heighten the utility of an allocated channel space. The data inputted to the randomizer 310 has a data format formed by inserting null bytes, which has a specified length of bytes but does not include typical data, into a specified position of the input transport stream data, which will be explained in detail later.

The data generator 305 generates data prearranged between a transmitter side and a receiver side (hereinafter referred to as "known data"). This known data refers to a special sequence having a specified pattern, and is inserted into the position to which null bytes of the randomized data are added. The known data can easily be detected from general data, and thus is used for the synchronization and equalization in the receiver side.

The first multiplexer 315 generates a data stream having the known data generated by the data generator 305 and inserted into the position of the data stream, into which the null bytes are inserted, in replacement of the null bytes of the data randomized by the randomizer 310.

The RS encoder 320 adds a parity of specified bytes to the data outputted from the first multiplexer 320 in order to correct errors occurring due to channels.

The interleaver 330 performs an interleaving of the data to which the parity outputted from the RS encoder 320 is added according to a specified pattern.

The trellis encoder 340 converts the data outputted from the interleaver 330 into data symbols, and performs an 8-level symbol mapping of the data through a trellis encoding at the rate of ⅔.

The second multiplexer 350 inserts a segment sync signal into the data that has been converted into symbols by the trellis encoder 340 in the unit of a segment, and inserts a field sync signal into the data in the unit of a field. Also, the second multiplexer 350 inserts a pilot signal into an edge portion of a low frequency band of a frequency spectrum by adding a specified DC value to the data signal of a specified level.

The modulator/RF-converter 360 performs a VSB modulation of the signal into which the pilot signal has been inserted by performing a pulse shaping of the signal and modulating the signal with an intermediate frequency (IF) carrier, RF-converts and amplifies the modulated signal, and transmits converted signal through an allocated channel.

Meanwhile, the digital broadcast receiver of FIG. 3 includes a tuner 410, a demodulator 420, an equalizer 430, a trellis decoder 440, a deinterleaver 450, an RS decoder 460, a derandomizer 470 and a known data detector 480, and operates in the reverse process of the digital broadcast transmitter of FIG. 3.

The tuner 410 selects the received signal, and converts the selected band signal into a baseband signal.

The demodulator 420 detects the sync signal from the baseband signal, and performs a demodulation of the baseband signal according to a pilot signal and the sync signals inserted into the baseband signal. The equalizer 430 removes a mutual interference between received symbols by compensating for a channel distortion of the demodulated signal due to the multi-path of the channel.

The trellis decoder 440 performs an error correction of the symbols, decodes the error-corrected symbols, and outputs symbol data. The deinterleaver 450 rearranges the decoded data, which was distributed by the interleaver 330 of the digital broadcast transmitter.

The RS decoder 460 error-corrects the deinterleaved data, and the derandomizer 470 derandomizes the data corrected through the RS decoder 460, so that the data of the MPEG-2 transport stream is restored.

Meanwhile, the known data detector 480 detects the position of the known data from the demodulated data, and outputs the known data, which is used for the demodulator's sync detection and the equalizer's compensation for the channel distortion. Details of the known data detector 480 will be explained later.

Figure 4:
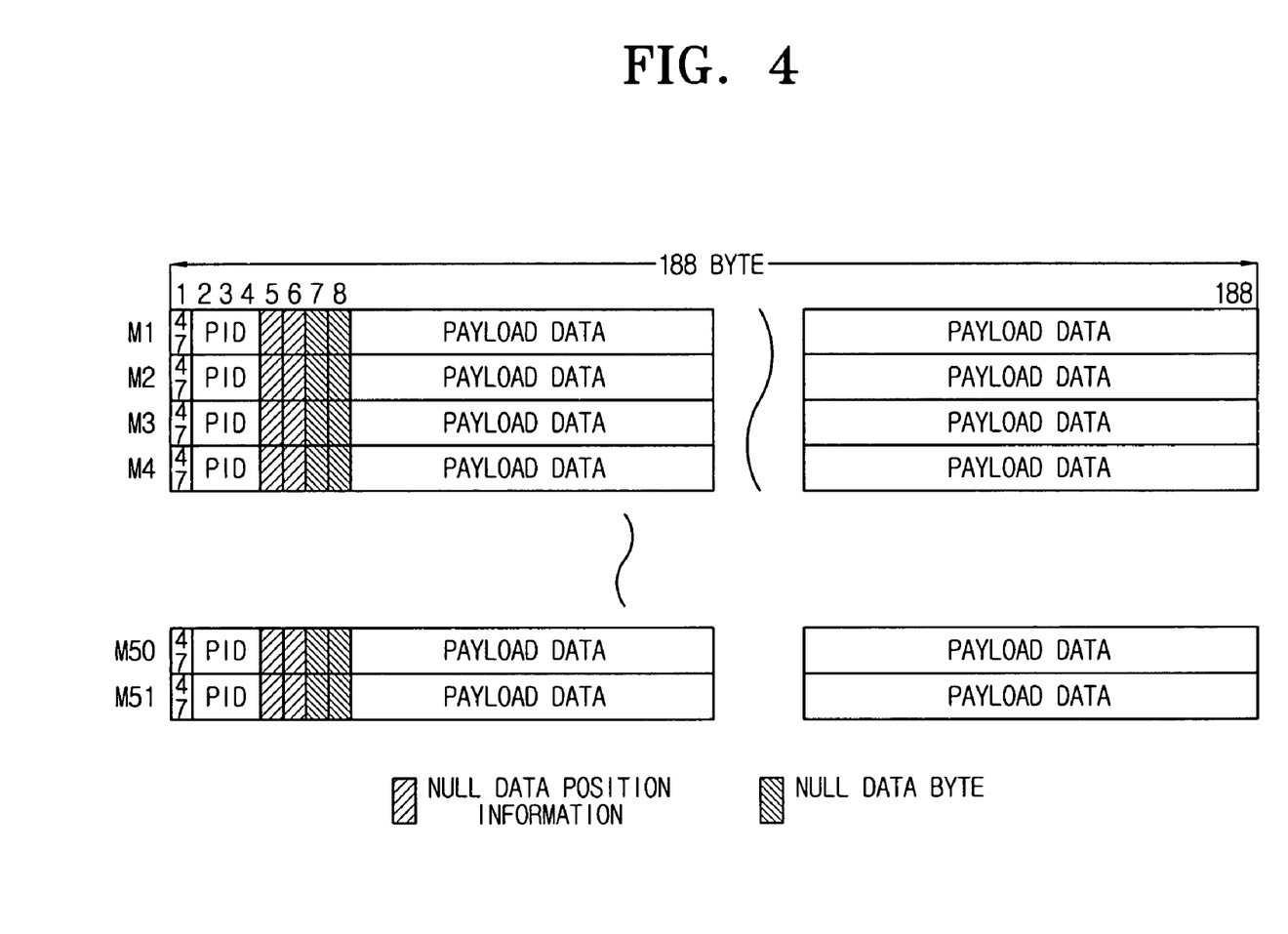
FIG. 4 is a view illustrating a format of MPEG-2 packet data according to the present general inventive concept.

FIG. 4 is a view illustrating an MPEG-2 packet data format according to the present general inventive concept. Referring to FIG. 4, a header of the MPEG-2 packet data is composed of a first byte that is a sync signal and three bytes including a PID (Packet Identity). Then, a modified field part composed of specified bytes is arranged, and the first two bytes of the modified field part constitute control information bits that include length information of the modified field.

Also, a specified number of null bytes is arranged after the control information bit of two bytes, and information about the position of the null bytes is inserted into the control information bits. Since the start position of the null bytes is fixed, the information about the position of the null bytes indicates the information about the length of the null bytes. After the null bytes, payload data to be transmitted is arranged.

Figure 5:
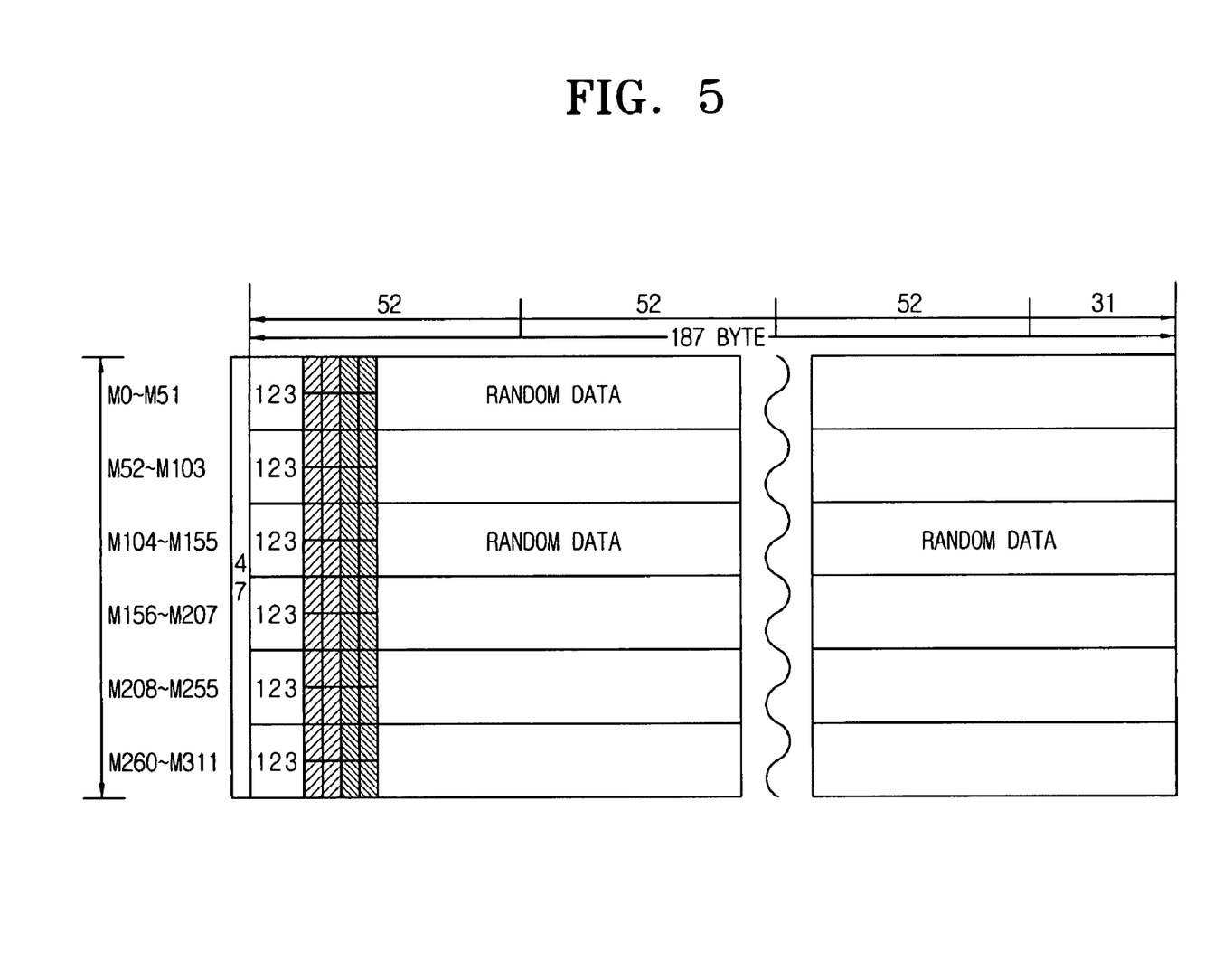
FIG. 5 is a view illustrating a format of randomized MPEG-2 packet data.

FIG. 5 is a view illustrating a randomized MPEG-2 packet data format into which the known data is inserted. Referring to FIG. 5, the first multiplexer 315 inserts the known data generated by the data generator 305 into the position of the null bytes in the data randomized by the randomizer 310, and outputs the data stream having the format as shown in FIG. 4.

Although FIG. 5 illustrates the known data composed of two bytes for the sake of convenience, the length of the known data may be longer than two bytes. Since this known data is inserted after the randomization as the data known between the transmitter side and the receiver side, it can easily be detected in distinction from the payload data, and is used for the synchronization and equalization in the receiver side.

Figure 6:
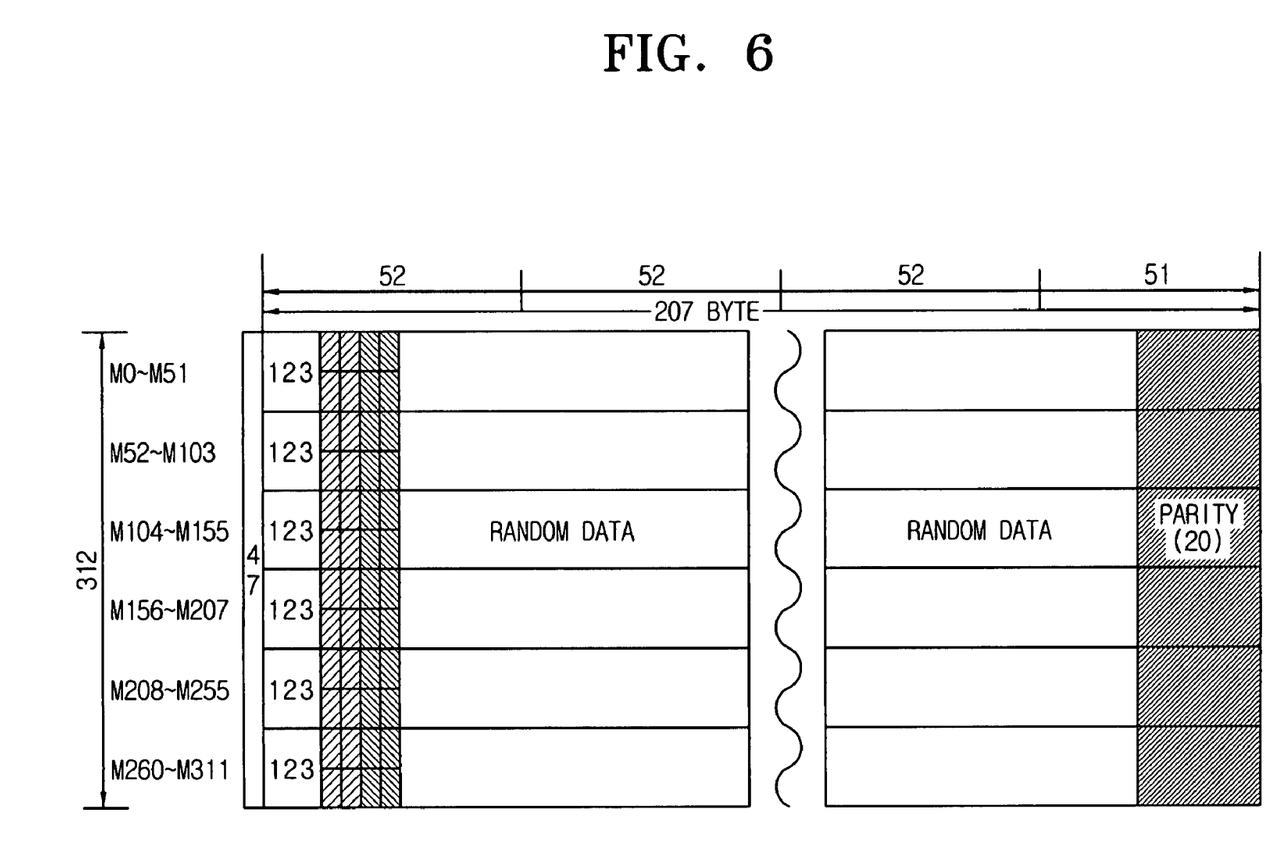
FIG. 6 is a view illustrating a format of data outputted from an RS encoder of FIG. 3.

FIG. 6 is a view illustrating a data format outputted from the RS encoder of FIG. 3. The RS encoder 320 adds a parity of specified bytes to the data outputted from the first multiplexer 315 in order to correct the errors occurring due to the channel. Referring to FIG. 6, the RS parity of 20 bytes is added to an end part of 187 bytes of the data stream outputted from the RS encoder 320.

Figure 7:
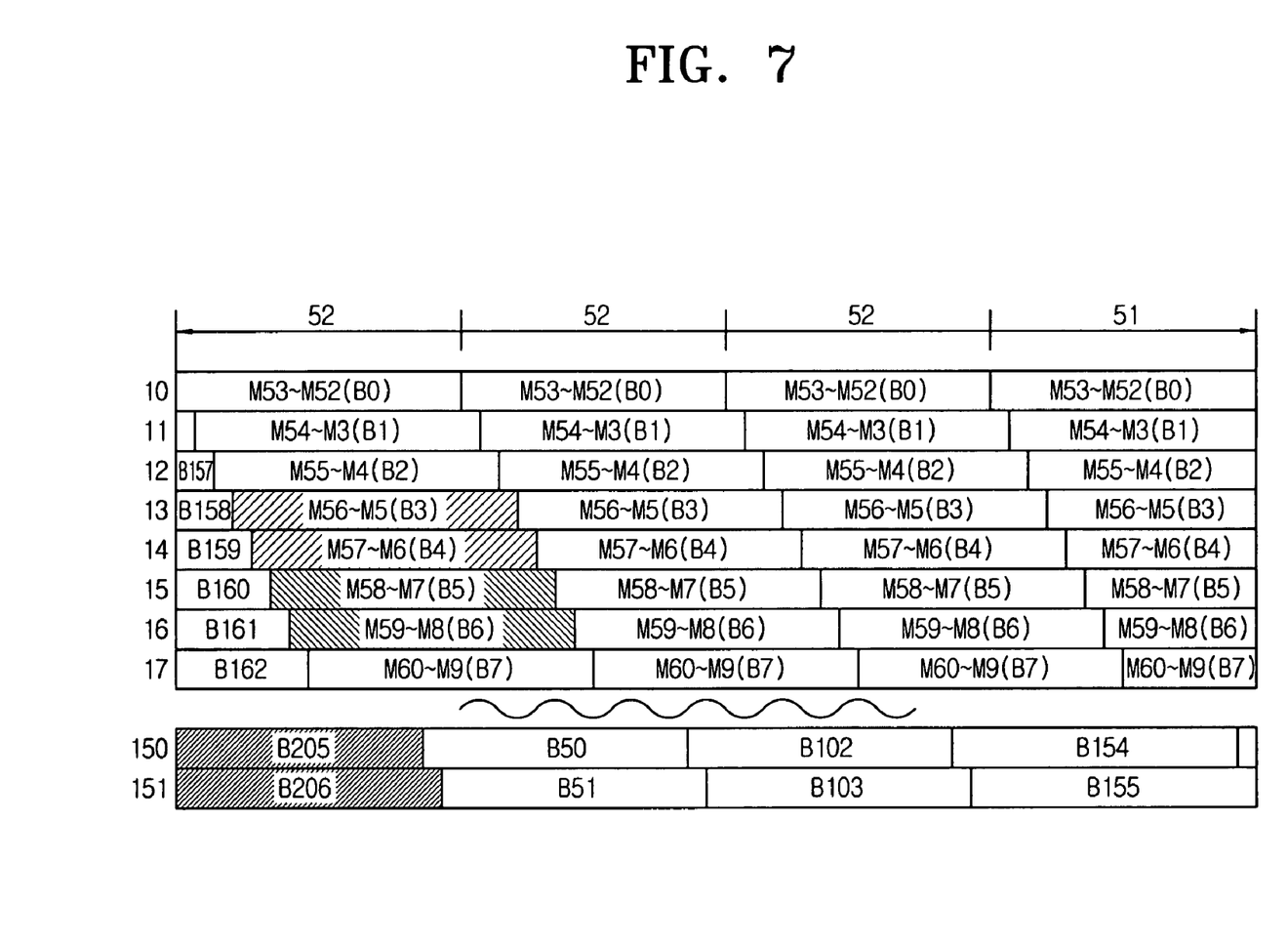
FIG. 7 is a view illustrating a format of data outputted from an interleaver of FIG. 3.

FIG. 7 is a view illustrating a data format outputted from the interleaver of FIG. 3. The interleaver 330 distributes the data on the time axis so that the order of the data stream is distributed and the transport signal becomes strong against the interference.

According to this data distribution performed by the interleaver 330, the data bytes arranged at the same positions of the different segments in a vertical direction are rearranged as the data stream successive in a horizontal direction in the unit of 52 bytes.

The fourth and fifth bytes of the respective segments, which are composed of the control information bits including position information of the known data in FIG. 6, are changed to the data stream (that is, M56-M5(B3) and M57-M6(B4))

successive in the horizontal direction as shown in FIG. 7. Accordingly, the control information bits are successively outputted.

Also, the fifth and sixth bytes of the respective segments, which are the known data, are changed to the data stream (that is, M58-M7(B5) and M59-M8(B6)) successive in the horizontal direction as shown in FIG. 7 after being interleaved. Accordingly, the same bytes of the known data inserted into the respective segments are outputted as the stream successive in the unit of 52 bytes.

Figure 8:
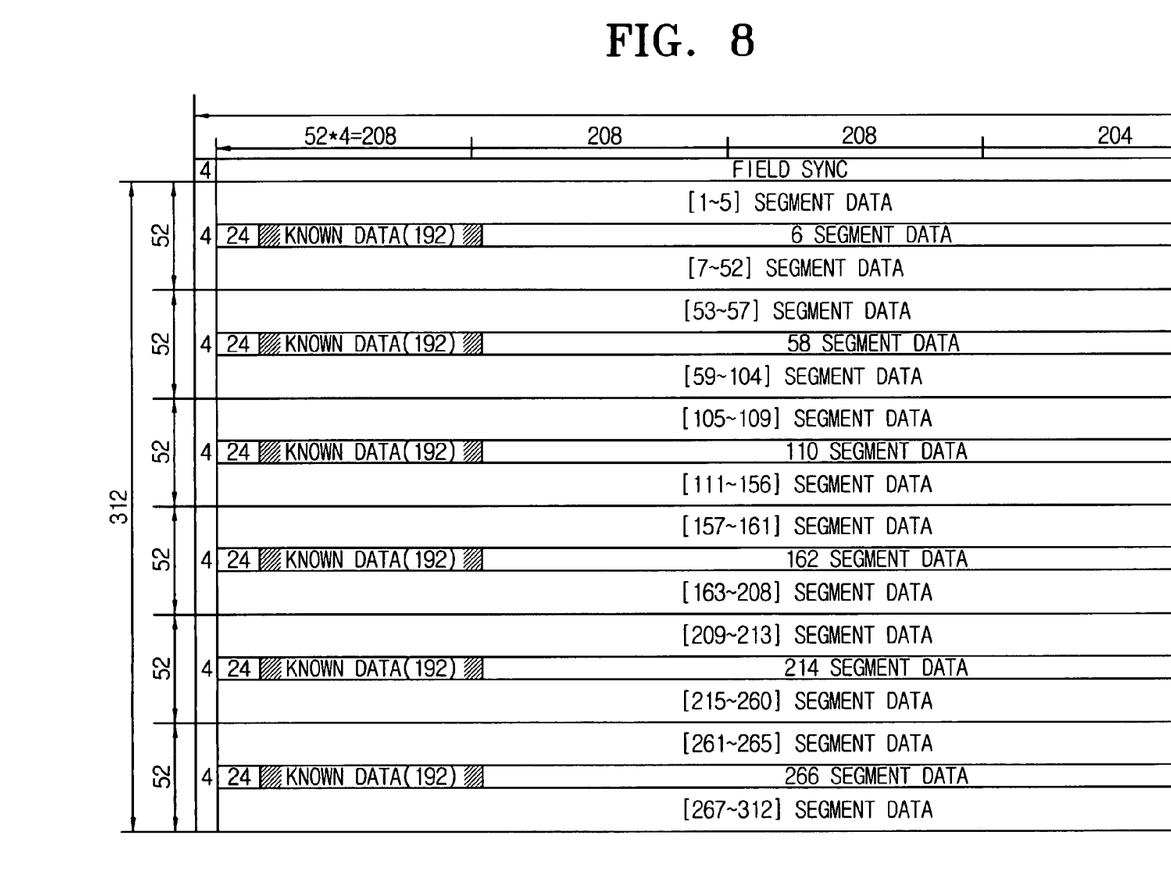
FIG. 8 is a view illustrating a format of data outputted from a trellis encoder of FIG. 3.

FIG. 8 is a view illustrating a data format outputted from the trellis encoder 340 of FIG. 3. The trellis encoder 340 encodes each byte of the data outputted from the interleaver 330 to four 8-level symbols.

In FIG. 8, the known data bytes of the same position appear as symbols successive for a specified length in one segment for every 52 segments. Also, in one field, 6 known data sequences appear. That is, in a field, 10*6=60 known data sequences including 10 null bytes appear in one field of the transport stream. Accordingly, the known data sequence can easily be detected from the payload data stream.

Figure 9:
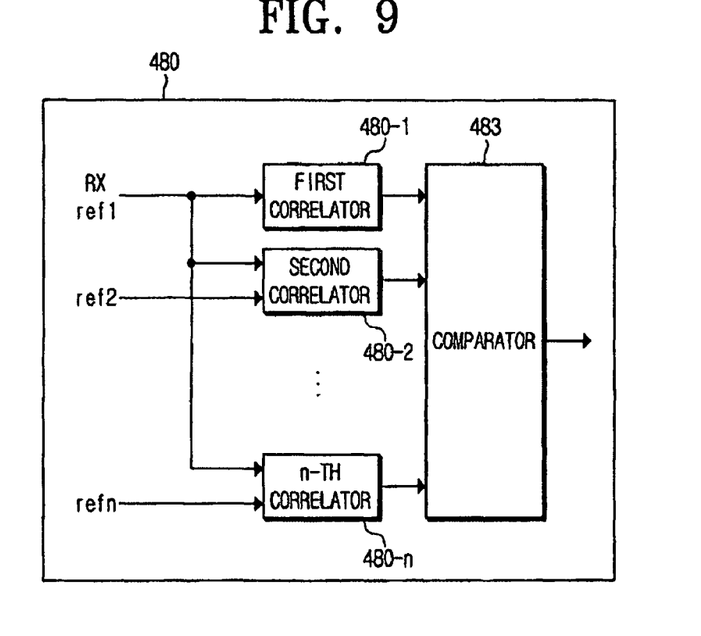
FIG. 9 is a view illustrating the construction of a known data location detector of FIG. 3.

FIG. 9 is a view illustrating the construction of the known data location detector 480 of FIG. 3.

The known data location detector 480 of the digital broadcast receiver of FIG. 3 includes a first correlator 480-1, second to n-th correlators 480-2 to 480-n and a comparator 483.

The first correlator 480-1 and the second to n-th correlators 480-2 to 480-n calculate correlation values between the data stream of the received signal and specified reference signals. The reference signals used in the first correlator 480-1 and the second to n-th correlators 480-2 to 480-n indicate numbers of all cases that may occur during the encoding of the known data in the transmitter side.

That is, the trellis encoder 340 in the transmitter side makes different symbols through the trellis encoding of the same known data according to initial values stored in its own memory. The number of possible initial values in the memory is a finite number, for example, four, and thus the symbol data obtained by performing the trellis encoding of the known data can finitely be determined and easily calculated.

Accordingly, using the first correlator 480-1 and the second to n-th correlators 480-2 to 480-n, the correlation values between the plural reference signals that indicate the number of all possible cases and the received signal are calculated.

The comparator 483 compares the output values of the first correlator 480-1 and the second to n-th correlators 480-2 to 480-n, and if a peak correlation value is produced during the comparison, the known data is detected at the location where the peak value is produced.

Figure 10:
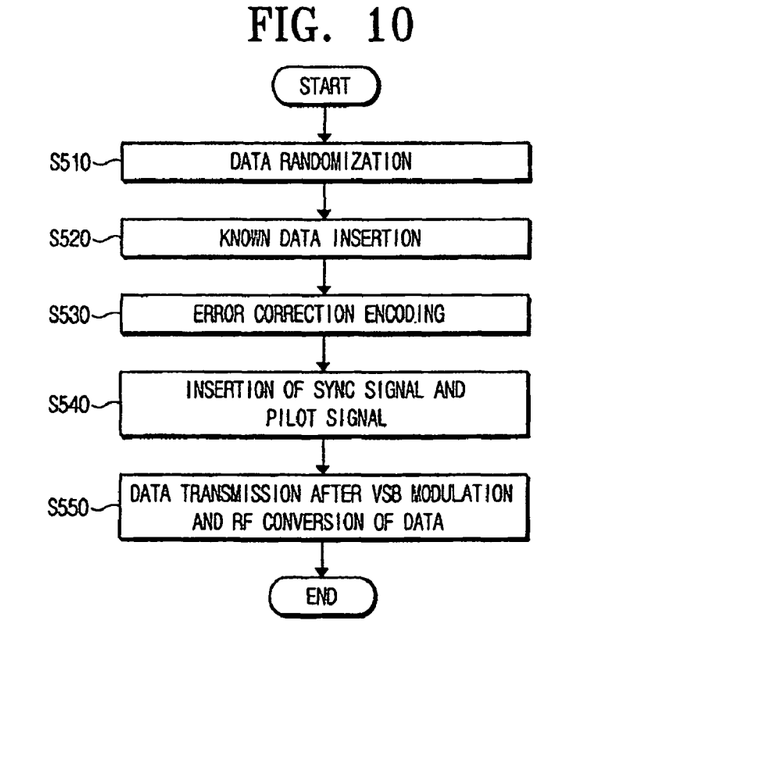
FIG. 10 is a flowchart explaining an operation of a digital broadcast transmitter according to an embodiment of the present general inventive concept.

FIG. 10 is a flowchart explaining the operation of the digital broadcast transmitter illustrated in FIG. 3.

The randomizer 310 randomizes the MPEG-2 transport stream including null bytes (operation S510). The data inputted to the randomizer 310 has the data format as shown in FIG. 4, which includes the header portion composed of the first byte that is the sync signal and 3-byte PIO, 2-byte control information bits including the information about the position of the null bytes, and null bytes composed of the specified length of bytes. Other bytes of the data refer to the payload data to be transmitted.

Then, the first multiplexer 315 generates the data stream by inserting the known data generated by the data generator 305 into the position of the null bytes included in the data randomized by the randomizer 310 (operation S520). The known data is the special sequence having the specified pattern known between the transmitter side and the receiver side, and can easily be detected in distinction from the general data.

Then, in order to correct the errors of the data, to which the known data is inserted, occurring due to the channel, the parity of the specified bytes is added to the data outputted from the first multiplexer 320, and then interleaved in the specified pattern. The interleaved data is converted into symbols, mapped onto the 8-level symbols through the trellis encoding at the rate of ⅔, and then error-correction-coded (operation S530).

Then, the segment sync signal is inserted into the symbol data in the unit of a segment, the field sync signal is inserted in the unit of a field, and then the pilot signal is inserted into the frequency spectrum (operation S540).

Then, the VSB modulation of the data signal is performed through the modulator/RF converter 360 in a manner that the signal into which the pilot signal is inserted is pulse-shaped and an amplitude modulation is performed with an IF carrier. The VSB-modulated signal is RF converted, amplified, and then transmitted through the allocated channel (operation S550).

Figure 11:
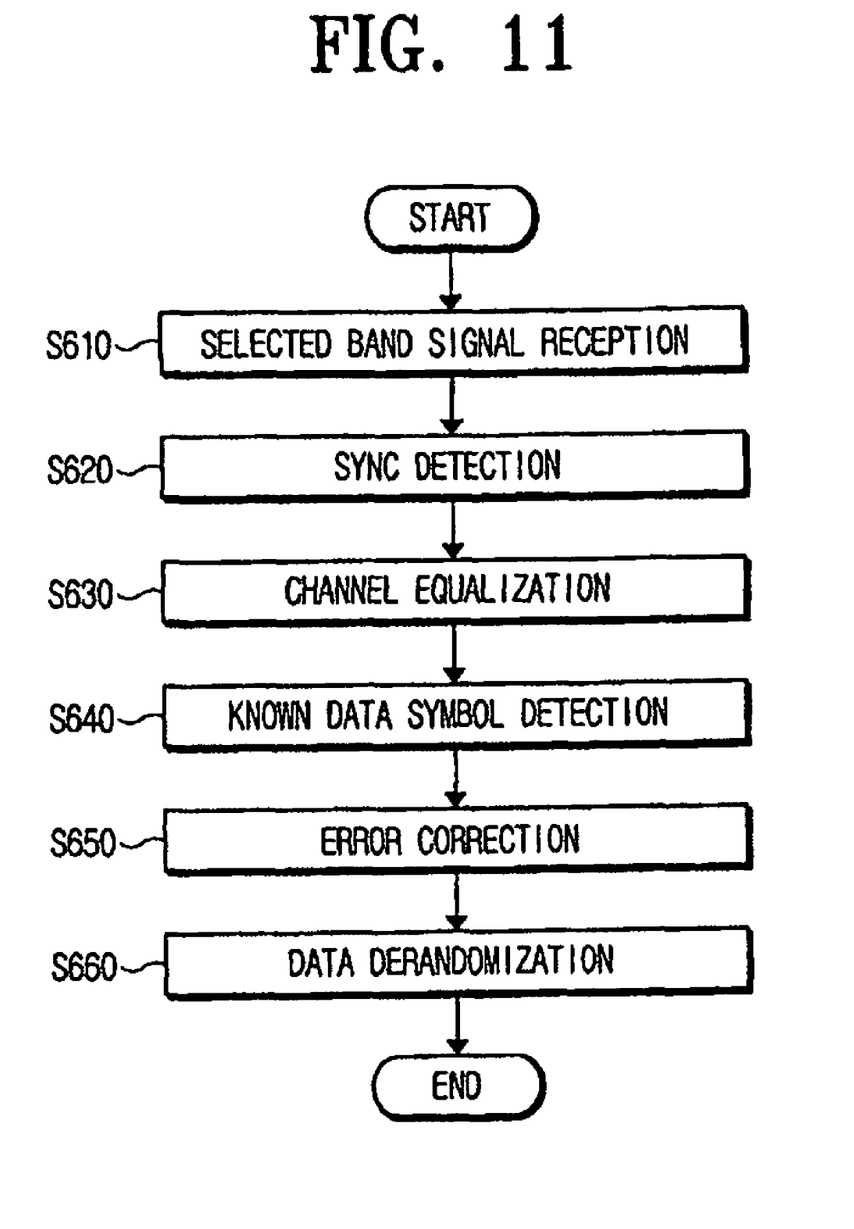
FIG. 11 is a flowchart explaining an operation of a digital broadcast receiver according to an embodiment of the present general inventive concept

FIG. 11 is a flowchart explaining the operation of the digital broadcast receiver according to an embodiment of the present general inventive concept.

The tuner 410 selects the received signal, and converts the selected band signal into the baseband signal (operation S610).

The demodulator 420 detects the sync signal from the baseband signal and performs the demodulation of the baseband signal according to the pilot signal and the sync signals inserted into the baseband signal (operation S620).

The equalizer 430 removes the mutual interference between the received data symbols by compensating for the channel distortion of the demodulated signal (operation S630).

Meanwhile, the known data detector 480 detects the position of the known data from the equalized data, and outputs the known data (operation S640). The first correlator 480-1 and the second to n-th correlators 480-2 to 480-n of the known data detector 480 calculate the correlation values between the plural reference signals and the received signal. The comparator 480 compares the correlation values, detects the known data at a position where the peak correlation value is produced, and provides the detected known data to the equalizer 430 for the compensation of the channel distortion. Also, the detected known data may be provided for the sync detection of the demodulator 420.

Then, the synchronized and equalized data is error-corrected, and the error-corrected symbols are decoded. The decoded data is rearranged through the deinterleaving, and then error-corrected through the RS decoding (operation S650).

Then, the error-corrected data is derandomized, and then outputted as the MPEG-2 transport stream data (operation S660).

As described above, according to the various embodiments of the present general inventive concept, the receiving performance of the digital broadcast transmitting/receiving system such as the synchronization and equalization can be improved even in a multi-path channel by generating and inserting null bytes into an MPEG-2 transport stream and transmitting the transport stream into which known data is inserted in replacement of the null bytes in a digital broadcast transmitter and by detecting the known data from the received signal and using the known data in synchronization and equalization in a digital broadcast receiver.

Also, according to the various embodiments of the present general inventive concept, the operation performance of an equalizer can be improved through proper adjustment of the amount and pattern of sequences of the known data that is inserted into the transport stream, and thereby improving the receiving performance of the digital broadcast transmitting/receiving system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents

What is claimed is:

1. A digital broadcast transmitter to transmit data to a digital broadcast receiver, the digital broadcast transmitter comprising:
   a known data exchanger to insert known data at a certain position in data;
   a trellis encoder to trellis encode the data including the known data having a specified length of bytes to an 8-level symbol at a rate of ⅔; and
   a modulator to perform a VSB modulation of the trellis encoded data,
   wherein the known data is a predefined sequence known between the digital transmitter and the digital broadcast receiver.

2. The digital broadcast transmitter as claimed in claim 1, further comprising an interleaver to interleave the data including the known data,
   wherein the trellis encoder trellis encodes the interleaved data including the known data.

3. The digital broadcast transmitter as claimed in claim 1, further comprising a randomizer to randomize the data,
   wherein the known data exchanger inserts the known data at the certain position in the randomized data.

4. The digital broadcast transmitter as claimed in claim 1, further comprising a data generator to generate the known data,
   wherein the known data is used by the digital broadcast receiver to remove an interference of the transmitted data.

5. The digital broadcast transmitter as claimed in claim 1, further comprising a Reed Solomon (RS) encoder to RS encode the data including the known data.

6. The digital broadcast transmitter as claimed in claim 1, further comprising a multiplexer to insert a segment sync signal, a field sync signal, and a pilot signal into the data including the known data.

* * * * *